May 10, 1927.

R. S. BURDETTE 1,628,304

SECTIONAL AIR BAG

Filed April 10, 1925   2 Sheets-Sheet 1

INVENTOR
Richard S. Burdette,
BY
ATTORNEY

May 10, 1927.  R. S. BURDETTE  1,628,304
SECTIONAL AIR BAG
Filed April 10, 1925   2 Sheets-Sheet 2
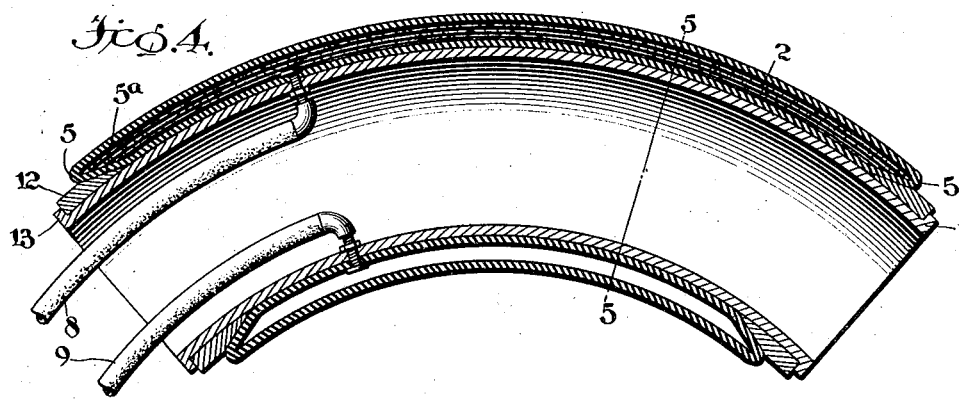
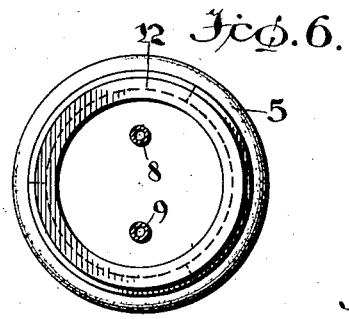
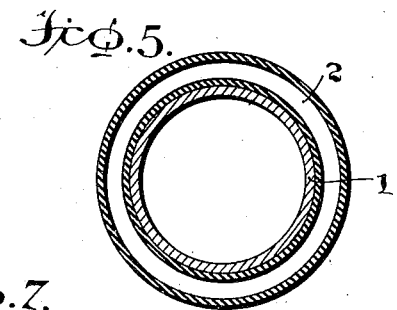
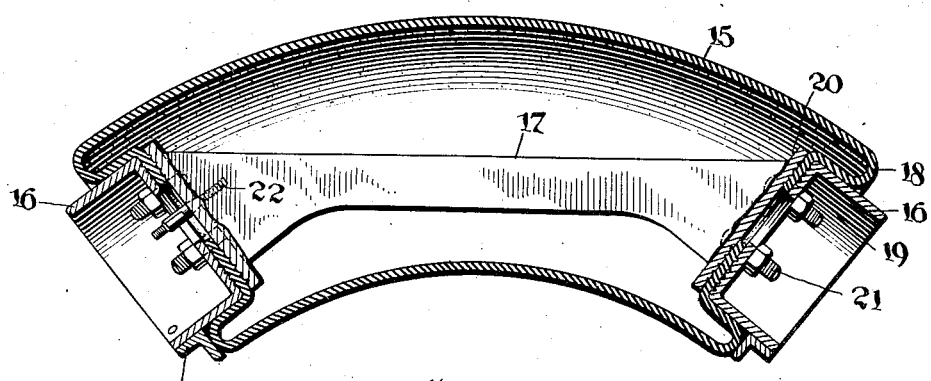
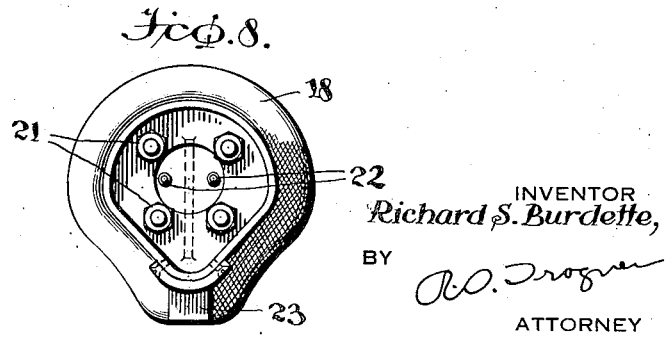
INVENTOR
Richard S. Burdette,
BY
ATTORNEY Patented May 10, 1927.

1,628,304

UNITED STATES PATENT OFFICE.

RICHARD S. BURDETTE, OF AKRON, OHIO, ASSIGNOR TO THE GOODYEAR TIRE & RUBBER COMPANY, OF AKRON, OHIO, A CORPORATION OF OHIO.

SECTIONAL AIR BAG.

Application filed April 10, 1925. Serial No. 22,205.

My invention relates to cores employed in the vulcanization of pneumatic tire casings, and it has particular relation to cores of the inflatable sectional type, suitable for use in repairing short sections of such casings.

One object of my invention consists in providing a novel type of flexible vulcanizing core composed of a relatively small amount of light-weight material so distributed that it is adapted to withstand relatively great internal pressure.

Another object of my invention is to provide a flexible sectional core in which undesirable effects of unbalanced internal stresses caused by an arcuate contour of the core are obviated.

Another object of my invention consists in providing a sectional vulcanizing core consisting of a metallic member and a replaceable inflatable rubber and fabric portion.

My invention relates particularly to pneumatic cores of the sectional so-called "airbag" type. In the repair of pneumatic casings it is necessary to vulcanize any uncured rubber used in the repair in order to give to the repaired portion a toughness and strength comparable with the other portions of the casing. In vulcanizing a tire casing, the defective portions are removed, raw rubber or rubber and fabric is inserted in place thereof, and the repaired casing is placed within a metallic mold having a recess which conforms to the contour of the outer surface of the casing. Within the casing is inserted an inflatable pneumatic core or airbag which is of substantially the same diameter as the inner periphery of the casing and of slightly greater length than the repaired portion of the casing. The mold in which the casing is placed is heated and the airbag is inflated so as to hold the repaired portion of the casing in contact with the mold under the desired pressure. If desired, the airbag may be heated by inflating it with either steam or hot water.

Heretofore it has been common practice to construct airbags of this character solely of rubberized fabric. One objection to this type of airbag has been that, although the walls of the bag are reinforced by contact with the inner surface of the tire casing and are therefore not subjected to any injurious stresses, nevertheless, the end portions thereof are totally unsupported and are subjected to the same pressure as are the walls of the bag. As the pressure necessary to cure properly a repaired casing is reasonably high, the total force developed in an airbag of large diameter, such as a truck tire or balloon tire bag, is very great. In order to prevent injury to the bag, it is necessary to reinforce the ends thereof by the addition of layers of reinforcing material. Also, in order to provide proper anchorage for these reinforcing ends, it is necessary to make the side walls of heavier material than would otherwise be necessary. Another objection to this type of bag is that, owing to the difference in the length of the outer periphery and the inner periphery of the bag, and the fact that the ends thereof are disposed at a considerable angle to each other, certain unbalanced stresses are produced therein which tend to deform the bag. A still further objection to this type of bag is that, as the bag is unitary, when any one portion of the bag fails, the entire bag is rendered useless.

By my invention, I have obviated these objections by providing a centrally disposed supporting member which substantially eliminates the undesirable effects of the unbalanced forces developed in the bag, which reduces the stress exerted upon the end of the bag and assumes a portion of the reduced stress and which permits of the replacement of those portions of the bag which may fail under ordinary working conditions.

For a more thorough description of my invention, reference may now be had to the accompanying drawings, of which:

Fig. 4 is a view similar to Fig. 2 of another form which my invention may assume;

Fig. 5 is a cross-sectional view of the bag illustrated in Fig. 4, the section being taken along the line 5—5 thereof;

Fig. 6 is an end elevational view of the bag illustrated in Fig. 4;

Fig. 7 is a longitudinal sectional view illustrating another form which my invention may assume; and Fig. 8 is an end elevational view of the bag illustrated in Fig. 7.

Figure 1:
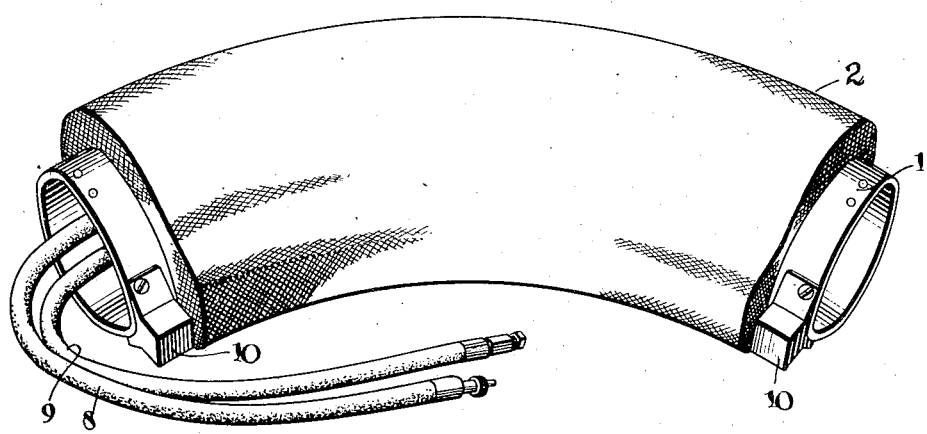
Fig. 1 is a perspective view of a bag constructed in accordance with my invention.
Figure 2:
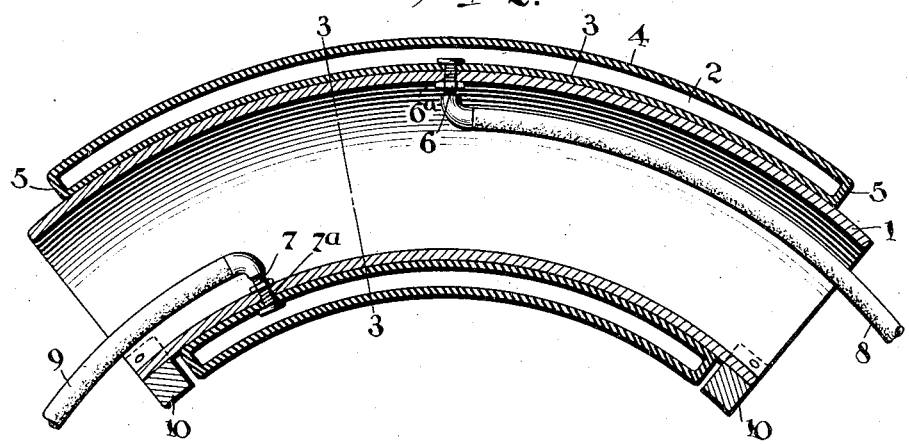
Fig. 2 is a longitudinal cross-sectional view of the bag illustrated in Fig. 1.
Figure 3:
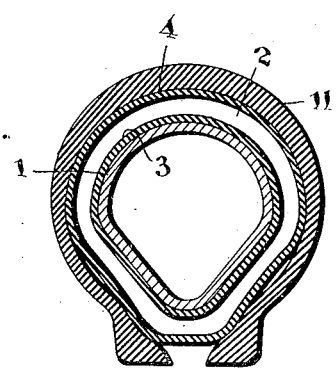
Fig. 3 is a cross-sectional view of the bag illustrated in Fig. 2, shown inserted within a tire casing, the view being taken along the line 3—3 of Fig. 2.

In the structure illustrated in Figs. 1, 2 and 3, I have shown a pneumatic core consisting of an arcuate sleeve 1, preferably composed of metal, upon which is mounted, in closely fitting engagement, a flexible arcuate sleeve or envelope 2, composed of rubberized fabric and consisting of an inner wall 3, an outer wall 4, and end portions 5. The flexible member 2 is provided with two fluid valves 6 and 7 which project through suitable openings 6ª and 7ª in the sleeve 1 and are connected to suitable conduits 8 and 9, respectively, to permit of the introduction and the removal of suitable inflating fluid. If desired, a circulation of heating fluid may be maintained through the conduits 8 and 9. The metallic member 1 is provided with a block 10 suitably attached thereto at each end, the block being mounted on the external surface of the inner portion of the member 1. The envelope 2 fits snugly over the member 1 but is detachably secured thereto. When the envelope becomes worn out or, for any other reason fails, it may be removed from the member 1 by disconnecting the conduits 8 and 9, pushing the valve stems 6 and 7 through the openings 6ª and 7ª in the member 1, removing one of the end blocks 10, and sliding the bag off its metallic support.

As best illustrated in Fig. 3, when the envelope 2 is inflated, the outer wall 4 thereof closely engages the inner surface of the tire casing 11, within which the member is inserted, and the inner wall 3 closely engages the supporting member 1. As fluid is introduced into the envelope 2, the outer wall 4 expands slightly to engage closely the tire casing, and, as it is not fastened to the member 1, there is a tendency for the ends 5 to be drawn inwardly, thereby slightly reducing the length of the bag.

By reason of the greater area of the outer periphery of the bag, as compared to the inner periphery, certain unbalanced forces are built up, which tend to force the inner periphery of the bag against the beads of the tire casing with a greater force per unit area than that existing between the outer surface of the airbag and the tire casing, thereby tending to mar the beads and causing deformation of the bag. In order to eliminate this objection, the blocks 10 are provided which engage a portion of the outer mold intermediate the beads of the casing and thereby prevent deformation of the bag or injury to the beads. It will be apparent that by reason of the relatively small width of the end members 5, the total force exerted thereon by the fluid pressure will be relatively small. Also, it will be apparent that by reason of the close contact of the wall 3 with the metallic member 1, any force exerted upon the end member 5 will be assumed by the member 1 without transmitting it throughout the length of the bag.

Referring now to the form of my invention illustrated in Figs. 4, 5 and 6, it will be observed that an envelope 2, similar to that described in connection with Fig. 2, is mounted upon an arcuate metal cylinder 1. The end portions 5 of the envelope 2, however, are provided with a portion 5ª inclined with respect to the adjacent surface of the member 1, which is provided with an annular supporting block 12 which closely engages the inclined portion 5ª of the member 5. The ends of the member 1 are upset, as indicated at 13, to position properly the blocks 12 thereon. These blocks 12 serve to brace the end portions 5 against strains exerted thereon by the fluid pressure within the envelope 2, thus causing the metallic member 1 to assume directly a large portion of such strains.

Referring to the form of my invention illustrated in Figs. 7 and 8. I have shown a cylindrical arcuate flexible member 15 provided with metallic ends 16, of cup-shape, which are mounted upon opposite ends of a metallic bracing member 17 disposed centrally within the member 15. The member 15 is of such length with respect to the member 17 that at its ends 18 it folds over or overlaps the cup-shape member 16. The ends 18 of the flexible member 15 are clampingly engaged between the cup-shape member 16 and a metallic plate 20, mounted upon the member 17, by means of suitable bolts 21. In order to provide an air-tight connection between the ends 18 and the member 16, the two opposed faces of the members 16 and 20 are serrated at the points where they engage the end of the member 15. Suitable valves 22 are mounted in one of the members 20 in order to provide for the admission and removal of a suitable inflating and heating medium.

The member 16 is provided with a supporting member 23 which serves to engage the mold intermediate the tire beads so as to prevent the exertion of undue stresses upon the beads of the casing or upon the inner surface of the airbag by reason of the unbalanced forces caused by the arcuate contour of the bag. In connection with Figs. 7 and 8 it will be observed that the greater portion of the end thrust of the bag is assumed by the metal end members 16 and the bracing member 17, so that only a small percentage of the total thrust is assumed by the end portions 18 of the flexible bag.

From the foregoing description, it will be apparent that I have provided a novel type of flexible core in which the strains are so reduced and distributed that relatively high pressures may be employed without detriment to a bag composed of a relatively small quantity of relatively light-weight fabric. It will also be apparent that by the provision made for the elimination of the unbalanced forces, the life of the bag will be materially prolonged and the possibility of injury to casings being cured by the airbag will be eliminated. It will be further apparent that the life of a bag of the character described will be greater than that of the old type of bag owing to the fact that the thinner flexible walls may be subjected to flexing with less injury thereto than is incident to the flexing of a bag having thicker walls. Furthermore, when the flexible member has become impaired, it is replaced, the life of the metallic portions of the bag being indefinite and materially greater than that of the rubber portions.

Although I have illustrated several forms which my invention may assume and have described in detail but a single application thereof, it will be apparent to those skilled in the art that it is not so limited but that various minor modifications and changes may be made therein without departing from the spirit of my invention, or from the scope of the appended claims.

What I claim is:

1. A vulcanizing core adapted to be disposed within a pneumatic tire casing comprising a closed inflatable member whose outer wall is continuous in a radial direction, a rigid supporting member for the inflatable member disposed therewithin, the parts being so constructed and arranged that the ends of the inflatable member are not secured to the supporting member but are free to roll therealong when the container is inflated.

2. A vulcanizing core adapted to be disposed within a pneumatic tire casing comprising an expansible segmental arcuate container formed with inner and outer continuous walls disposed in substantially concentric relation and joined to each other at their ends, and an inextensible support for the container adapted to contact with the inner wall thereof throughout its extent.

3. A vulcanizing core adapted to be disposed within a pneumatic tire casing comprising a closed segmental arcuate expansible container provided with concentric radially continuous walls and a rigid support for the container provided with a radially continuous wall adapted to contact with the inner wall of the container.

4. A vulcanizing core adapted to be disposed within a pneumatic tire casing comprising an expansible segmental arcuate container provided with concentric continuous radially disposed walls joined at their ends to form a closed receptacle, and an arcuate rigid supporting member adapted to contact with the inner wall of the container throughout its extent, the end portions of the container being unconfined and free to move longitudinally with respect to the support.

5. A vulcanizing core adapted to be disposed within a pneumatic tire casing comprising an expansible segmental arcuate container provided with concentric continuous radially disposed walls joined at their ends to form a closed receptacle, an arcuate rigid support formed with a continuous wall adapted to be positioned within the container and to contact with the inner wall thereof throughout its extent, the end portions of the container being unconfined and free to move longitudinally with respect to the support.

6. A vulcanizing core adapted to be positioned within a pneumatic tire casing comprising a rigid supporting member and an expansible closed segmental arcuate container disposed thereon, said container being provided with concentric flexible walls adjacent its ends overlapping the support in concentric relation and free to move longitudinally of the support when the container is inflated.

7. A vulcanizing core adapted to be positioned within a pneumatic tire casing including bead portions, comprising a rigid supporting member, an expansible segmental arcuate closed inflatable container provided with concentric outer and inner walls adjacent its ends freely movable longitudinally of the support when the bag is inflated, and blocks disposed on the support adjacent the end portions of the bag adapted to prevent undue pressure on the bead portions of the tire casing.

In witness whereof, I have hereunto signed my name.

RICHARD S. BURDETTE.